July 6, 1965   L. C. GARDNER, SR., ET AL   3,193,299
BELL AND SPIGOT JOINT WITH SELF-LOCKING WEDGE RINGS
Filed Aug. 7, 1963   2 Sheets-Sheet 1

INVENTORS.
LELAND C. GARDNER, SR.
LAWSON F. WALDROP, JR.
BY
ATTORNEY

July 6, 1965  L. C. GARDNER, SR., ETAL  3,193,299
BELL AND SPIGOT JOINT WITH SELF-LOCKING WEDGE RINGS
Filed Aug. 7, 1963  2 Sheets-Sheet 2
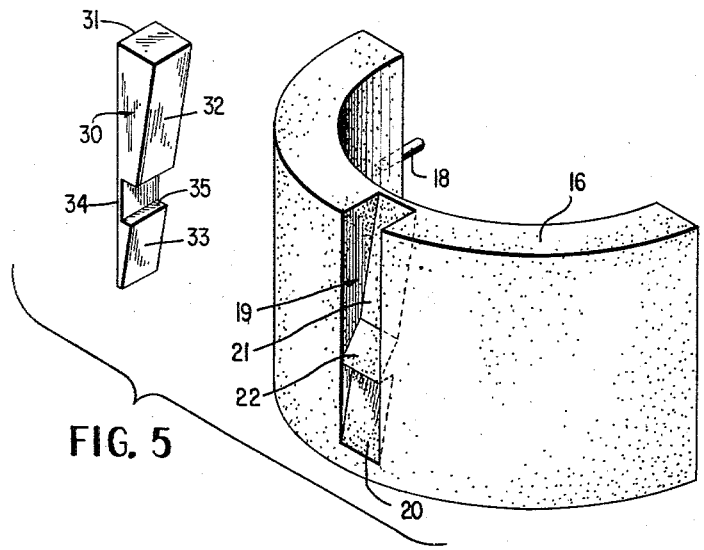
FIG. 5
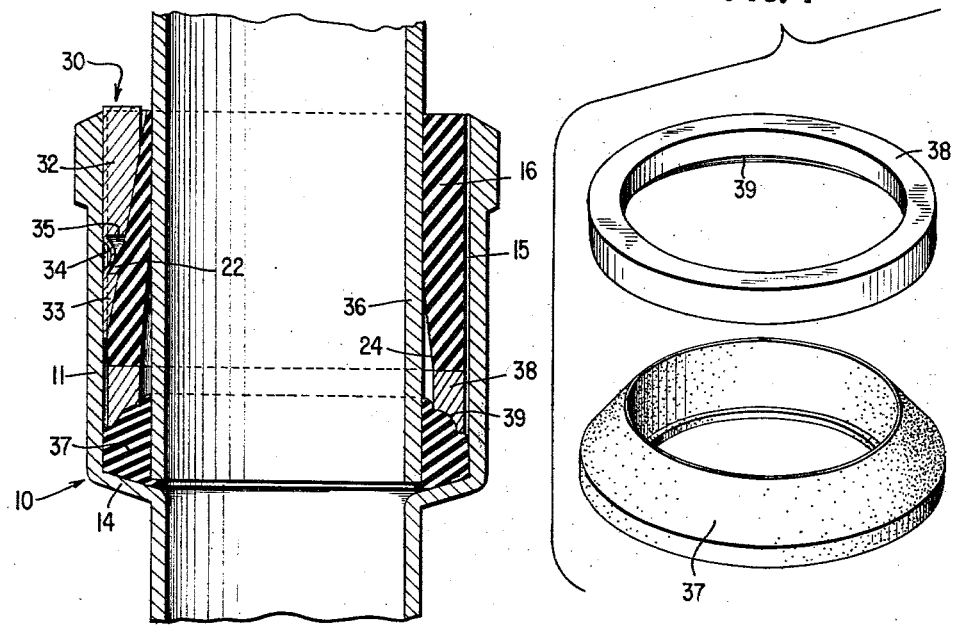
FIG. 6
FIG. 7
INVENTORS.
LELAND C. GARDNER, SR.
LAWSON F. WALDROP, JR.
BY
ATTORNEY United States Patent Office 3,193,299
Patented July 6, 1965

3,193,299
BELL AND SPIGOT JOINT WITH SELF-LOCKING WEDGE RINGS
Leland C. Gardner, Sr., 519 Rich St., and Lawson F. Waldrop, Jr., 529 S. York Ave., both of Rock Hill, S.C.
Filed Aug. 7, 1963, Ser. No. 300,527
8 Claims. (Cl. 277—190)

This invention relates to a joint and seal structure for cast iron soil pipes and the like.

An object of the invention is to provide simplified, economical and efficient means for coupling and sealing interfitting soil pipes employing either a spigot end or plain end inside of the well-known hub end.

Another object of the invention is to eliminate entirely the use of screw-threaded coupling parts and the use of lead and oakum commonly used for joining and sealing soil pipe ends.

Another object is to provide a joint and seal structure which is self-locking and which forms a highly effective fluid seal in the annular chamber between the interfitting pipe ends and also a firm mechanical connection between the pipe ends which will not become dislodged accidentally after proper installation.

Other objects and advantages of the invention will be apparent during the course of the following detailed description.

Figure 1:
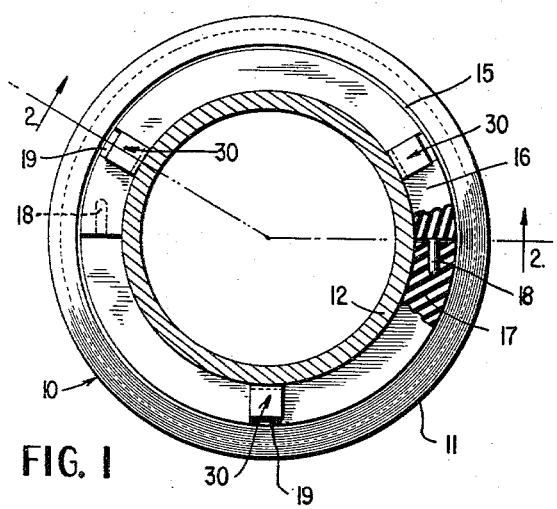
Figure 3:
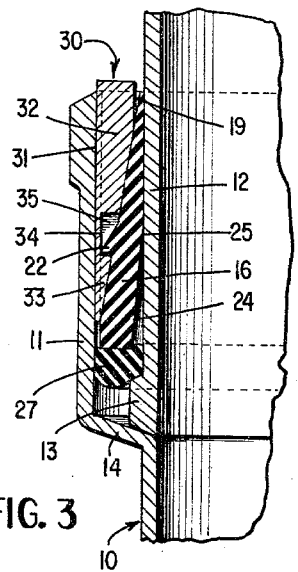
Figure 2:
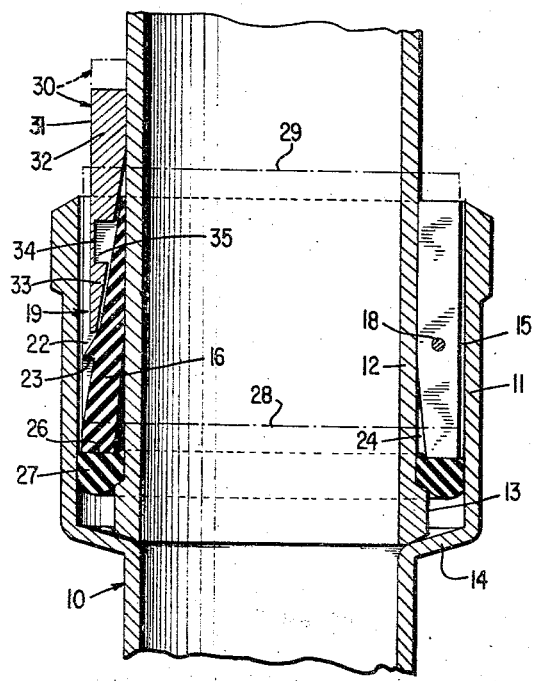
Figure 4:
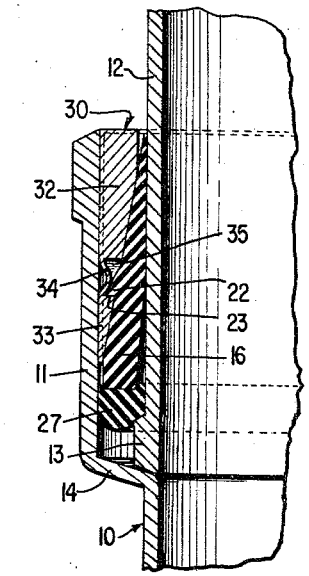

In the accompanying drawings forming a part of this application and in which like numerals are employed to designate like parts throughout the same, FIGURE 1 is a plan view of the joint and seal structure embodying the invention, partly in section, FIGURE 2 is a vertical section taken on line 2—2 of FIGURE 1 and depicting in solid and broken lines two stages of the installation process, FIGURE 3 is a fragmentary vertical section similar to FIGURE 2 and showing a further stage of the installation of the invention structure, FIGURE 4 is a view similar to FIGURE 3 showing the final installation of the invention joint and seal, FIGURE 5 is an exploded perspective view of an adapter section and wedge employed in the invention, FIGURE 6 is a vertical section similar to FIGURE 2 showing a modification of the invention applicable to soil pipes using a plain end and hub end, and FIGURE 7 is an exploded perspective view of a compression ring and gasket utilized in the modification depicted by FIGURE 6.

In the drawings, wherein for the purpose of illustration are shown preferred embodiments of the invention, attention is directed first to FIGURES 1–5 inclusive, wherein the numeral 10 designates a soil pipe including a hub end 11 and a telescopically interfitting spigot end 12 having an enlargement 13 at its lower end engaging an annular wall portion 14 of the hub end 11 in the usual manner. An annular chamber 15 is established between the interfitting pipe ends 11 and 12 and the joint and seal structure of the invention is received within this annular chamber and substantially fills the same, as shown in the drawings.

The invention structure comprises a companion pair of semi-cylindrical adapter halves or sections 16 and 17 adapted to surround the spigot end 12 and to enter the annular chamber 15. In assembly, the two sections 16 and 17 constitute a substantially continuous ring having a radial wall thickness only slightly less than the radial width of the chamber 15 and an axial length which allows the adapter to fill the major portion of the chamber 15 above the enlargement 13. Dowel pins 18 on the companion adapter sections guide and hold the same together detachably in assembled relation about the spigot end 12. The adapter sections 16 and 17 are formed preferably of neoprene or the like which is quite hard but which possesses a small degree of resiliency for a purpose to be described. The hardness of the adapter is such that it can withstand substantial axial compression without buckling or deforming appreciably.

The annular adapter composed of the companion sections 16 and 17 has a plurality, preferably three, circumferentially equidistantly spaced external downwardly tapering longitudinal side wall grooves 19 formed therein and with the tops of these grooves opening through the top flat annular end face of the adapter. The lower tapered ends of the grooves 19 terminate near and above the lower end of the adapter and flush or tangent with the cylindrical outer face thereof as indicated at 20. The bottom walls 21 of the grooves 19 are flat and inclined with respect to the axis of the cylindrical adapter and each groove 19 therefore provides a slender wedge-shaped cavity in the exterior surface of the adapter extending from its top throughout the major portion of its axial length and terminating short of its bottom and gradually diminishing in depth toward the bottom of the adapter. As shown particularly in FIGURES 2, 3 and 4, the wall thickness of the annular adapter gradually diminishes in thickness toward the top of the adapter adjacent each groove 19. Between these grooves, the adapter has a full wall thickness radially throughout its circumference.

Within each groove 19, substantially midway of its length, the same is provided with an integral radially projecting tapered locking projection or tooth 22 having a bottom locking shoulder 23. These projections or teeth are quite stiff but have some resiliency for a purpose to be described. The outer face of each tooth 22 is inclined to a greater degree than the adjacent bottom wall 21 of the groove 19 and the top of the tooth tapers smoothly into the bottom wall 21, as shown. The extremity or tip of each tooth 22 is substantially flush with the outer cylindrical face of the adapter and each tooth bridges the adjacent groove 19 transversely and is formed integral with the side walls thereof. The two-part annular adapter composed of the sections 16 and 17 has its bore undercut and tapered upwardly as shown at 24 from the bottom of the adapter to approximately its longitudinal center indicated at 25. Above the point 25, the bore of the adapter is cylindrical for conforming engagement about the exterior of the spigot end 12. The bottom end face 26 of the adapter ring is flat, annular and relatively broad as shown.

A compressible annular gasket 27 of relatively soft neoprene or other rubber-like material and much softer than the adapter surrounds the spigot end 12 below the adapter and between its lower end 26 and the enlargement 13 as shown in FIGURE 2. Prior to compression axially, the gasket 27 when relaxed may have its top disposed approximately at the level of the broken line 28. The gasket 27 is shown compressed axially and radially by the adapter in full lines in FIGURE 2 and in this condition, the gasket 27 forms an effective fluid-tight seal in the chamber 15 between the hub and spigot ends of the soil pipe. The relatively rigid adapter ring composed of sections 16 and 17 is forced axially downwardly to compress the gasket 27 by a suitable implement, not shown, and forming no direct part of this invention. This tool is capable of forcing the adapter downwardly within the chamber 15 to the full line position shown in FIGURE 2 and temporarily holding it in such position with the gasket 27 compressed. Prior to this compressing operation, the top of the adapter would be positioned approximately as indicated by the broken line shown at 29 in FIGURE 2.

The invention additionally embodies a plurality of strong metal wedges 30 corresponding in number and configuration to the several grooves 19 and tapering downwardly during use and being rectangular in cross section and engageable snugly within the grooves 19 with their outer straight faces 31 engaging the bore of the hub end 11 and projecting somewhat radially outwardly of the grooves 19 when fully installed. Each metal wedge 30 has a relatively thick upper wedge portion 32 and a lower relatively slender wedge portion 33, the portions being integrally joined by an outer thin-walled section 34 formed by a rectangular recess 35 in the inner inclined face of each wedge. As will be described, when each wedge 30 is driven downwardly in a selected groove 19 the adjacent tooth 24 of the adapter will yield inwardly and pass over the lower wedge portion 33 and then enter the recess 35 inwardly of the thin walled section 34 to positively lock the wedge in the driven position, FIGURES 2, 3 and 4. The final driving of each wedge 30 by means of a suitable tool or hammer will cause bending or buckling of the wall section 34 as depicted in FIGURE 4 but the thin walled section will not fracture or separate from the wedge portions 32 and 33 and the wall section 34 continues to interconnect these wedge portions at all times. In the final driven position of each wedge, FIGURE 4, the resilient locking tooth 22 has its lower locking shoulder 23 engaged over the top of wedge portion 33 to firmly lock the wedge 30 in the driven position.

The mode of installation and use of the invention for joining and sealing the soil pipe ends is briefly as follows with particular reference to FIGURES 2 through 4. The uncompressed gasket 27 and the adapter ring composed of the two halves 16 and 17 are applied over the spigot end 12 and with the spigot end are introduced into the hub end 11. The wedges 30 may be loosely placed into the tops of the grooves 19 by the fingers, FIGURE 2. A suitable tool, not shown, is brought to bear upon the upper end of the annular adapter and the same is forced downwardly within the chamber 15 to compress the gasket 27 approximately as shown in FIGURE 2. The rigidity of the adapter sections 16 and 17 is such that they will not buckle or deform appreciably during this operation. The tool continues to hold the adapter down into compressive relation with the gasket and the gasket now seals the chamber 15 between the hub and spigot ends at the top of enlargement 13.

The wedges 30 are now tapped or driven downwardly as shown in FIGURE 3 until the lower wedge portions 33 pass over the projecting teeth 22 and until the portions 33 will not descend any further and until the resilient teeth 22 enter the recesses 35 and become interlocked with the tops of the wedge portions 33, as shown in FIGURE 3.

Finally, an additional driving force is imparted to each wedge 30, FIGURE 4, and when this occurs the lower wedge portion 33 will resist further downward movement and the thin walled section 34 will bend and buckle but will not separate from the portions 32 and 33, FIGURE 4. When this occurs, the heavy upper wedge portion 32 will descend an additional distance within the groove 19 and will tightly wedge between the bore of the hub end 11 and the hard neoprene adapter. After this final stage of driving of the wedges 30, the two-piece adapter is firmly and permanently locked in compressive engagement with the gasket 27 and the tool used previously for compressing the gasket is removed and the installation of the joint and seal is completed and will not subsequently become dislodged. The invention forms not only an efficient fluid seal between the pipe ends but also a very sturdy joint or connection of a mechanical nature. The invention structure is compact and after installation is contained bodily within the chamber 15, substantially filling this chamber. The invention may be installed very quickly by unskilled labor and in a minimum time without special tools and without the use of lead and oakum or like semi-liquid materials and without the necessity for nuts and bolts or other like separable fasteners which are objectionable to plumbers. The advantages of the invention will be readily apparent to those skilled in the art.

FIGURES 6 and 7 show a modified form of the invention applicable to soil pipes having the hub end 11 and a telescopically interfitting plain end 36 without the enlargement 13. In this form of the invention, the identical stiff adapter ring composed of the sections 16 and 17 may be employed along with the identical wedges 30 previously described and the operation of these parts and their construction need not be repeated herein. A compressible gasket 37 of neoprene or the like is utilized instead of the gasket 27 and the gasket 37, when relaxed, is upwardly conically tapering externally and has a cylindrical bore to receive the plain end 36 as shown in FIGURES 6 and 7. Intermediate the adapter and the gasket 37, a metallic compression ring 38 is placed within the chamber 15 in surrounding relation to the plain end 36. The bottom of the ring 38 is preferably contoured at 39 to force the gasket 37 both downwardly against the wall 14 and radially inwardly against the exterior surface of plain end 36 in order to establish a reliable fluid-tight seal. The remainder of the invention is identical to the previously-described form in FIGURES 1-5 and no further description is deemed necessary.

It is to be understood that the forms of the invention herewith shown and described are to be taken as preferred examples of the same, and that various changes in the shape, size and arrangement of parts may be resorted to, without departing from the spirit of the invention or scope of the subjoined claims.

Having thus described our invention, we claim:

1. A joint and seal structure for soil pipes and the like having telescopically interfitting ends and an annular chamber therebetween, said structure comprising a compressible gasket within said chamber near the bottom thereof adapted when compressed to form a fluid-tight seal between said interfitting ends, an annular relatively hard adapter body within said chamber and above said gasket and bearing upon the gasket and of a radial thickness to substantially fill said chamber and shiftable downwardly to compress the gasket and having radially projecting circumferentially spaced locking parts and external grooves which taper axially from their outer ends and radially outwardly adjacent the locking parts and extending below and above the same, and a corresponding number of metallic wedges which are tapered complementary to the groove taper and having their thickest section substantially equal to the greatest radial thickness of said adapter body to be driven downwardly within said grooves and between the grooves and the bore of the outermost pipe end for frictionally and positively locking the adapter body in a downward position compressing said gasket, said wedges provided in their inner sides and intermediate their ends with locking recesses receiving said locking parts of the adapter body in interlocking relation, said recesses forming on said wedges adjacent thin walled sections interconnecting upper and lower portions of the wedges, said thin walled sections buckling during final driving of the wedges to allow the upper portions of the wedges to descend a final distance into said grooves, the lower portions of the wedges then remaining substantially stationary relative to the adapter body.

2. The invention as defined by claim 1, and wherein said annular adapter body is a two-part body including substantially semi-cylindrical companion sections, and dowel pin means for interconnecting said two parts in assembled relationship.

3. The invention as defined by claim 1, and wherein said adapter body and said gasket are formed of rubber-like material and said adapter body is substantially harder than said gasket enabling it to compress the gasket without materially deforming the adapter body.

4. A joint and seal structure for soil pipes having telescopically interfitting ends and an annular chamber between said ends, said structure adapted to be received by said chamber and comprising an annular compressible gasket within said chamber near the bottom thereof, substantially rigid annular adapter means within said chamber and above said gasket and of a radial thickness to substantially fill said chamber and shiftable downwardly within said chamber to compress the gasket, said adapter means having circumferentially spaced top opening external longitudinal side grooves which taper axially from their outer ends and radially outwardly and which extend for a major portion of the length of the adapter means, generally radial resilient locking teeth on the adapter means within said grooves intermediate the ends of the grooves, and a corresponding number of drivable wedges which are tapered complementary to the groove taper and having their thickest section substantially equal to the greatest radial thickness of said adapter means and adapted to enter said grooves longitudinally and substantially coextensive therewith when fully driven, said wedges having interior side recesses intermediate their ends adapted to receive said teeth in interlocking relation when the wedges are driven into said grooves, said wedges having wall portions of greatly reduced thickness adjacent said recesses adapted to buckle during final driving of the wedges, whereby upper portions of the wedges only may descend an increased distance into said grooves to frictionally lock the adapter means and wedges between said interfitting ends in said chamber.

5. The invention as defined by claim 4, and wherein said adapter means is a two-part ring of relatively hard non-metallic material directly above said gasket and bearing upon the gasket.

6. The invention as defined by claim 4, and wherein said adapter means is a two-part ring of relatively hard non-metallic material above said gasket and spaced therefrom, and an annular rigid compression ring separate from the last-named ring and between the same and said gasket.

7. The invention as defined by claim 6, and wherein said gasket when relaxed is upwardly conically tapered exteriorly and has a cylindrical bore surrounding and engaging the innermost pipe end, said compression having its lower end contoured to force said gasket downwardly and radially inwardly when the compression ring is forced downwardly within said chamber.

8. A joint and seal structure for soil pipes having telescopically interfitting ends and an annular chamber between said ends, said structure adapted to be received by said chamber and comprising an annular compressible gasket within said chamber near the bottom thereof, a substantially rigid annular adapter ring within said chamber above said gasket and shiftable downwardly within the chamber to compress the gasket, said adapter ring having a wall portion which tapers axially from its inner end toward its outer end and radially inwardly and extending for the major portion of the axial length of said ring, at least one resilient locking element on said wall portion projecting radially thereof, and a coacting drivable wedge member tapered complementary to said wall portion of the adapter ring and having its thickest section substantially equal to the greatest radial thickness of the adapter ring, said wedge member having a least one interior side recess intermediate its ends adapted to receive said locking element in interlocking relation when the wedge member is driven inwardly relative to the adapter ring.

References Cited by the Examiner
UNITED STATES PATENTS

| | | | |
|---|---|---|---|
| 763,542 | 6/04 | Crawford et al. | 285—421 |
| 1,884,063 | 10/32 | McWane | 285—296 |
| 1,969,789 | 8/34 | Finken. | |

FOREIGN PATENTS

| | | |
|---|---|---|
| 477,252 | 6/29 | Germany. |

CARL W. TOMLIN, *Primary Examiner.*